(12) United States Patent
Landry

(10) Patent No.: US 9,813,101 B1
(45) Date of Patent: Nov. 7, 2017

(54) ELECTRONIC PRIVACY APPARATUS AND RELATED METHODS

(71) Applicant: Jonathan Philip Landry, Ellington, CT (US)

(72) Inventor: Jonathan Philip Landry, Ellington, CT (US)

( * ) Notice: Subject to any disclaimer, the term of this patent is extended or adjusted under 35 U.S.C. 154(b) by 0 days.

(21) Appl. No.: 15/373,567

(22) Filed: Dec. 9, 2016

Related U.S. Application Data

(60) Provisional application No. 62/352,201, filed on Jun. 20, 2016.

(51) Int. Cl.
*H04M 1/00* (2006.01)
*H04B 1/3888* (2015.01)

(52) U.S. Cl.
CPC .................. *H04B 1/3888* (2013.01)

(58) Field of Classification Search
CPC ... H04B 1/3877; H04B 1/3888; H04B 1/3883
See application file for complete search history.

(56) References Cited

U.S. PATENT DOCUMENTS

| | | |
|---|---|---|
| 8,385,974 B1 | 2/2013 | Bishop |
| 8,731,186 B1 | 5/2014 | Haddad |
| 9,031,610 B2 | 5/2015 | Kulas |
| D751,058 S | 3/2016 | Cocchia et al. |
| 9,369,170 B2 | 6/2016 | Sorrentino |
| 2011/0128384 A1 | 6/2011 | Tiscareno et al. |
| 2012/0282977 A1* | 11/2012 | Haleluk ............... H04B 1/3888 455/556.1 |
| 2013/0316690 A1 | 11/2013 | Wildner et al. |
| 2015/0018056 A1 | 1/2015 | Gillikin |
| 2015/0077530 A1* | 3/2015 | Jang ................... H04N 13/0438 348/56 |
| 2015/0163385 A1* | 6/2015 | Haddad ................ H04N 5/2254 348/374 |

OTHER PUBLICATIONS

Malarie Golkey, Ipatch Case for Iphone Protects Your Camera Lens and Privacy, Jun. 30, 2014. Printed from internet site (http://www.digitaltrends.com/mobile/ipatch-case-protects-iphone-camera-lens/) on Sep. 11, 2015. See attached.

* cited by examiner

*Primary Examiner* — Xin Jia
(74) *Attorney, Agent, or Firm* — Ramon Urteaga

(57) ABSTRACT

An apparatus for enveloping a portable communication or storage device includes a plurality of walls configured to at least partially enclose the portable communication or storage device. The apparatus also includes a processor, and a first shutter that is associated with one or more of the walls. The first shutter is operatively coupled to the processor, and is disposed so as to overlie a first camera lens of the portable communication or storage device. The first shutter has a first condition in which the taking of digital impressions with the first camera lens is unobstructed, and a second condition in which the taking of digital impressions with the first camera lens is hindered. The processor is configured to verify that a plurality of conditions is met before allowing the first shutter to toggle between the first and second conditions of that first shutter.

20 Claims, 6 Drawing Sheets

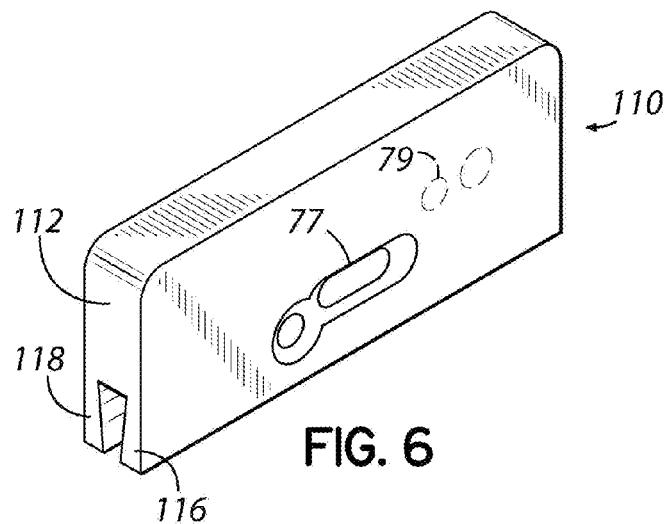
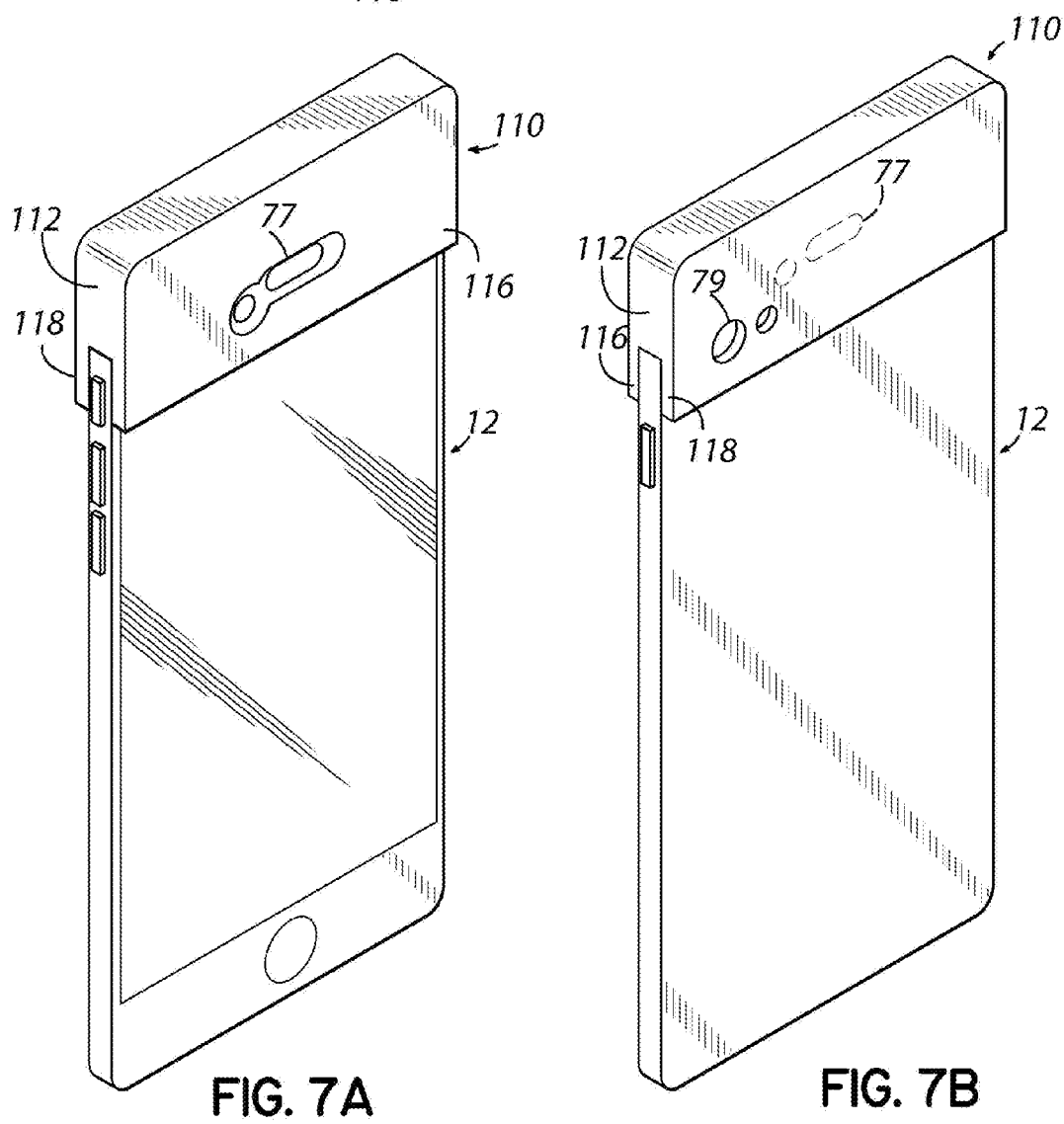

ELECTRONIC PRIVACY APPARATUS AND RELATED METHODS

CROSS-REFERENCE TO RELATED APPLICATION

This application claims the filing date benefit of U.S. Provisional Application No. 62/352,201, titled ELECTRONIC PRIVACY APPARATUS AND RELATED METHODS, filed Jun. 20, 2016, the entire contents of which are hereby incorporated by reference herein.

TECHNICAL FIELD

The present disclosure is generally related to electronic apparatus and, more particularly, to electronic apparatus used to envelop portable communication and/or storage devices such as tablets, mobile phones, or smartwatches.

BACKGROUND

Known portable communication and/or storage devices such as tablets or mobile phones are typically found in controlled environments, such as the workplace, and their use permitted and sometimes even encouraged as a means of communication among individuals operating in those environments (e.g., coworkers) and with the outside world. Devices of the type described above are often capable of taking, storing, and even transmitting digital impressions, such as digital photographs, digital audio, and/or digital video. That capability could however be problematic in particular controlled environments.

For example, hospitals and other medical-services establishments often operate under strict privacy-based regulatory frameworks that make the unauthorized sharing and/or transmission of digital images outside of the establishment a potential source of liability. More specifically, for example, the external, unauthorized sharing, and/or transmission of a digital image depicting a patient's body may be found to violate that patient's privacy rights, and the establishment may face undesired consequences as a result. This is more so in view of the ubiquitous nature of mobile phone use and the increased capability of mobile phones, which may inadvertently result in a digital image being broadly shared through social media, for example.

Likewise, manufacturing sites often carry out manufacturing operations that are intended to remain secret, so as to prevent competitors from gaining an unfair competitive advantage from learning the details of those operations. While the use of portable communication and/or storage devices in the interior of those manufacturing sites may be encouraged—so as to foster communication between technical personnel, for example—it may lead to the unauthorized sharing of digital impressions with the outside world, and the information falling into the hands of a competitor. In another non-limiting example, finance-related facilities may be exposed to the unauthorized taking and even the unauthorized sharing of digital impressions containing social security numbers or other sensitive financial information.

Yet in another example, high-security areas such as certain sections of an airport or other government-controlled facilities may face similar challenges from exposure to portable communication and/or storage devices having the functionality described above.

It would be desirable, therefore, to address the shortcomings described above as well as others in connection with the use of portable communication and/or storage devices typically found in controlled environments.

SUMMARY

In one embodiment, an apparatus is disclosed for enveloping a portable communication or storage device. The apparatus includes a plurality of walls configured to at least partially enclose the portable communication or storage device. The apparatus also includes a processor, and a first shutter that is associated with one or more of the walls. The first shutter is operatively coupled to the processor, and is disposed so as to overlie a first camera lens of the portable communication or storage device. The first shutter has a first condition in which the taking of digital impressions with the first camera lens is unobstructed, and a second condition in which the taking of digital impressions with the first camera lens is hindered. The processor is configured to verify that a plurality of conditions is met before allowing the first shutter to toggle between the first and second conditions of that first shutter.

The apparatus may additionally have a second shutter that is disposed so as to overlie a second camera lens of the portable communication or storage device, and which is operatively coupled to the processor. In that embodiment, the second shutter has a first condition in which the taking of digital impressions with the second camera lens is unobstructed, as well as a second condition in which the taking of digital impressions with the second camera lens is hindered. The processor is configured to verify that the plurality of conditions is met before allowing each of the first and second shutters to toggle between the respective first and second conditions. Additionally or alternatively, the apparatus may include a power source that is operatively coupled to the processor and to the first shutter.

In specific embodiments, the apparatus has a wireless communication element that is operatively coupled to the processor for enabling communication between the apparatus and the portable communication or storage device, or with a server that is external to the apparatus. The first shutter may include a dispersion film, with the first condition corresponding to a clear state of the dispersion film, and with the second condition corresponding to an opaque state of the dispersion film. Additionally or alternatively, a switch may be operatively coupled to the processor, with that switch having a first position when the portable communication or storage device is enveloped by the apparatus, and a second position when the portable communication or storage device is not enveloped by the apparatus. The switch, if present, may be a limit switch that has a pin protruding through one of the walls of the apparatus, with the first position of that limit switch corresponding to a depressed condition of the pin. The pin in that embodiment is configured to be depressed upon engaging contact with the portable communication or storage device when that device is enveloped by the apparatus.

In another specific embodiment, the first shutter includes a retractable element and an actuator that is operatively coupled to the processor and to the retractable element. The second condition in that embodiment corresponds to the retractable element blocking the first camera lens, and the first condition corresponds to the retractable element not blocking the first camera lens. The plurality of walls may include one or more walls that are made of a rigid material, and one or more walls made of an elastomeric material. The plurality of walls may define first and second portions of the apparatus that are hingedly coupled to one another, with pivotal movement of the first and second portions relative to one another allowing insertion and/or removal of the portable communication or storage device respectively into and/or from an interior volume of the apparatus.

In another embodiment, a privacy system is disclosed. The privacy system includes a portable communication or storage device that has at least one camera lens. The system also includes an apparatus that is configured for enveloping the portable communication or storage device. The apparatus includes a plurality of walls configured to at least partially enclose the portable communication or storage device, as well as a processor. A shutter of the apparatus is associated with one or more of the walls and is operatively coupled to the processor, with the shutter being disposed so as to overlie the at least one camera lens of the portable communication or storage device. The shutter has a first condition in which the taking of digital impressions with the at least one camera lens is unobstructed and a second condition in which the taking of digital impressions with the at least one camera lens is hindered. The processor is configured to verify that a plurality of conditions is met before allowing the shutter to toggle between the first and second conditions of that shutter.

The portable communication or storage device may, for example, be a mobile phone. The walls may include one or more openings configured to prevent obstruction of telephonic or media features of the mobile phone. The system may also include a server or external computer that is wirelessly connected to at least one of the apparatus or the mobile phone.

In yet another embodiment, a method is disclosed for controlling use of a portable communication or storage device in a controlled environment, with the portable communication or storage device having at least one camera lens. The method includes enveloping the portable communication or storage device in an apparatus that has a processor and a shutter operatively coupled to the processor. The shutter has first and second conditions to respectively leave unobstructed or hinder the taking of digital impressions with the at least one camera lens. The method includes the processor verifying that a plurality of conditions is met, with the processor allowing or disallowing, in response to the verifying that the plurality of conditions is met, the shutter to toggle between the first and second conditions of that shutter. Verifying that the plurality of conditions is met may include verifying that the portable communication or storage device is enveloped by the apparatus.

Additionally or alternatively, the method may include verifying that the location of the apparatus or the portable communication or storage device is within a predetermined distance of an external server or computer. In a specific embodiment, verifying that a plurality of conditions is met includes verifying that an instruction by a user to the portable communication or storage to take a digital impression, is effected from within a pre-specified application that is installed in the portable communication or storage device. The method may also include the processor communicating with an external server or computer. In specific embodiments, the method includes the portable communication or storage device communicating with the external server or computer.

BRIEF DESCRIPTION OF THE DRAWINGS

The objectives and features of the invention will become more readily apparent from the following detailed description taken in conjunction with the accompanying drawings in which:

FIG. 6 is a perspective view of an apparatus for at least partially enveloping a portable communication or storage device in accordance with another embodiment of the invention.

FIG. 7A is a perspective view of the apparatus of FIG. 6 partially enveloping a mobile phone.

FIG. 7B is a view similar to FIG. 7A, showing a rear of the apparatus and mobile phone.

DETAILED DESCRIPTION OF PARTICULAR EMBODIMENTS

To the extent that any meaning or definition of a term in this written document conflicts with any meaning or definition of the term in a document incorporated by reference, the meaning or definition assigned to the term in this written document shall govern. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Also, as used herein, the term "releasable coupling" and related terms refer to a type of coupling in which the coupled structures may be readily detached, decoupled, or otherwise separated from one another in a simple manner and without causing the destruction or damage of any of those structures. For sake of further explanation, a permanent—rather than a "releasable"—type of coupling may refer, for example, to two structures that are integrally formed with one another, or which are adhesively attached, such that their separation would necessarily result in at least some level of damage to one or more of the parts being separated from one another.

Figure 5:
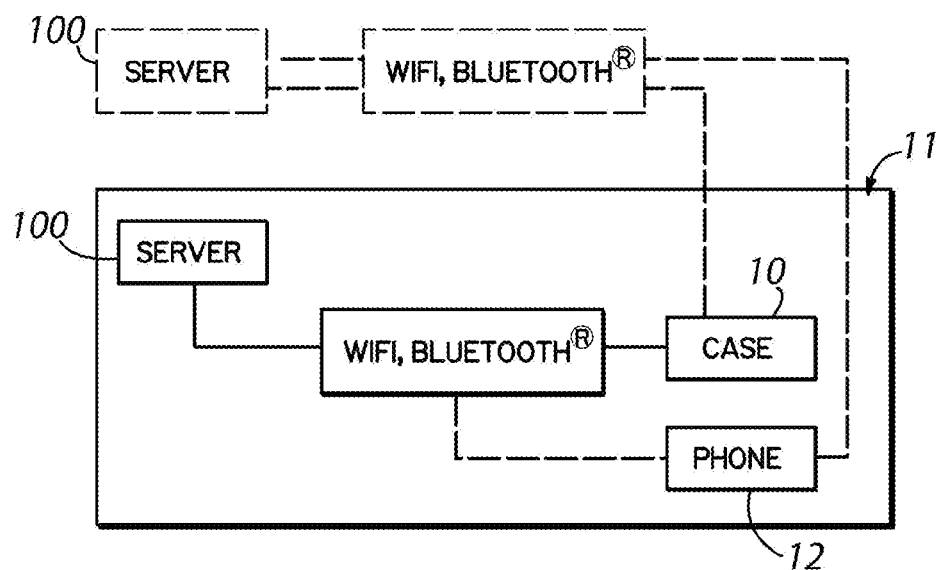
FIG. 5 is a schematic representation of a controlled environment in which the apparatus of FIGS. 1, 1A, 2A-2C, 3, and 4 may be used.

With reference to the figures, and particularly to FIGS. 1, 1A, 2A, 2B, and 2C, an illustrative apparatus in the form of an enclosure or case 10 is shown for use in a controlled environment (FIG. 5). Case 10 is configured to at least partially encase or envelop a portable communication and/or storage device in the form of a mobile phone 12. It is understood that, while the example embodiment illustrated described herein refers to a case 10 specifically configured to envelop or encase a mobile phone 12, the principles of operation, structure and functionality described in connection with that embodiment are similarly applicable to other types of portable communication and/or storage devices. For example, other embodiments may be sized, shaped, and configured to envelop or encase tablets or other small computers having the capability to take, store, and/or transmit digital impressions.

Similarly, other embodiments not shown in the figures may be sized and configured to envelop or encase portable communication and/or storage devices capable of taking, storing, and/or transmitting digital impressions and in the form of Augmented Reality ("AR") devices, optical head-mounted displays such as those commercially available under the Google Glass® trade name, or smartwatches such as those commercially available under the Apple Watch® trade name. The example case 10 of FIGS. 1, 1A, and 2A-2C at least partially envelops the mobile phone 12. Specifically, the case 10 has a plurality of walls that are configured to envelop substantially all surfaces of the mobile phone 12, with the exception of the front surface 14 of the mobile phone 12, which defines an interface of the user with that phone 12. As more fully explained below, the front surface 14 of the mobile phone 12 is only partially covered by a pair of walls in the form of top and bottom front sections 20, 22 of the case 10.

In the example embodiment shown in FIGS. 1, 1A, and 2A-2C, the case 10 is made up of first and second portions 24, 26 that, when fully coupled and/or engaged with one another, firmly encase the mobile phone 12. The first and second portions 24, 26 are hingedly coupled to one another so as to permit those two portions to at least partially separate when desired, so as to provide access to an interior volume 28 of the case 10. In the illustrated embodiment, pivotal movement of the first and second portions 24, 26 away from one another is effective to allow insertion of the mobile phone 12 into the interior volume 28 defined by the case 10, as well as to allow removal of the mobile phone 12 from the interior volume 28. In the illustrated embodiment, hinged coupling between first and second portions 24, 26 is defined by a pair of discontinuities in the form of slits or notches 30 located in a respective pair of side walls 33 of case 10.

Figure 2A:
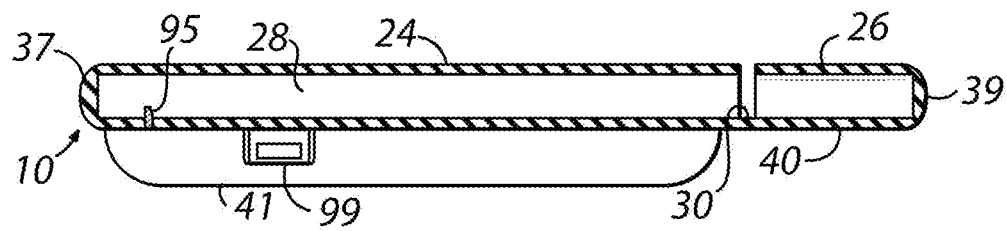
FIG. 2A is a cross-sectional view taken generally along line 2A-2A of FIG. 1.
Figure 2B:
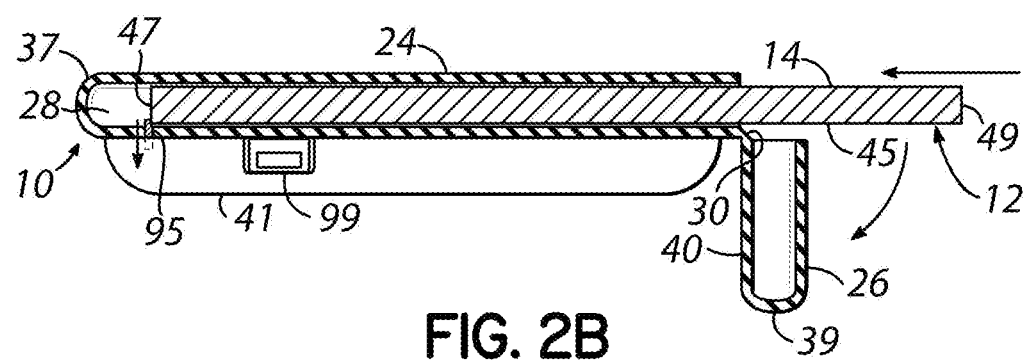
FIG. 2B is a view similar to FIG. 2A, illustrating insertion of a portable communication or storage device into an interior volume of the apparatus.
Figure 2C:
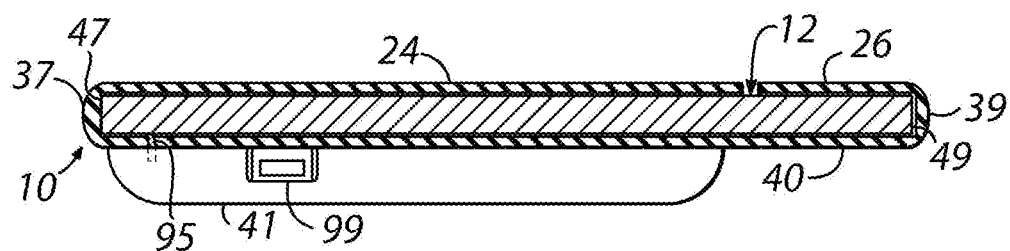
FIG. 2C is a view similar to FIGS. 2A and 2B illustrating the apparatus enclosing the portable communication or storage device.

Referring particularly to FIGS. 2A-2C, when it is desired to envelop the mobile phone 12 in case 10, the first and second portions 24, 26 are folded relative to one another, as schematically depicted in FIG. 2B. That figure illustrates folding of second portion 26 away from first portion 24, along the hinged coupling of those two portions 24, 26 defined by the slits or notches 30 in the side walls 33 of case 10. FIG. 2C illustrates the mobile phone 12 having been fully inserted into interior volume 28, and the case 10 having returned to its original shape, in which the first and second portions 24, 26 cooperate with one another to effectively envelop the mobile phone 12. Return of the case 10 to its original shape is facilitated, in the illustrated embodiment, by the resilient nature of the material(s) making up first and second portions 24, 26. In that embodiment, the side walls 33, as well as top and bottom walls 37, 39 and a back wall 40 of second portion 26 of case 10, are made up of a flexible, elastomeric material such as a thermoplastic polyurethane having a hardness durometer value in the range from about 70 to about 95. An elastomeric material as described above provides a suitable combination of flexibility, which allows easy folding of first and second portions 24, 26 relative to one another, and hardness, which may be desirable in order to protect electronic components of the case 10—described in further detail below—and to protect the mobile phone 12 itself from damage from inadvertent impact.

The materials making up the remainder of the case 10 are also suitably chosen, for example, to protect the electronic components housed in the interior of case 10, and/or to protect the mobile phone 12 from damage upon inadvertent impact. In the illustrated embodiment, and by way of example, the top front section 20, as well as a back wall 41 of first portion 24 of case 10, are made up of a hard plastic material, such as an acrylonitrile butadiene styrene (ABS) thermoplastic polymer. Making only certain parts of case 10 of a molded hard plastic may be desirable in order to minimize the need to redesign an entire case 10 so as to conform to a different model of phone or other portable communication and/or storage device. More specifically, the manufacturer of case 10 may wish to have one common molded hard-plastic part of the case 10, housing electronic components in its interior, that cooperates with a variety of interchangeable elastomeric parts of the case required for different types or models of phones or similar devices.

While the embodiment of FIGS. 1, 1A, and 2A-2C includes first and second portions 24, 26 that are hingedly coupled so as to only partially separate from one another, it is contemplated that the first and second portions 24, 26 could alternatively be completely separable from one another to allow insertion and removal of the mobile phone 12 respectively into and from the interior volume 28 defined by the case 10. In such embodiments, the first and second portions may for example be releasably coupled to one another through a snap-type of coupling. In one particular embodiment, not shown in the figures, the first and second portions 24, 26 are slidably coupled to one another, with sliding motion of those two portions relative to one another being effective to selectively join or separate those two portions 24, 26 of the case 10.

Alternative embodiments are also contemplated in which the case 10 is made of only one portion, or made of portions in a number greater than two. For example, and while not shown in the figures, the case 10 could be a unitary body made of a highly flexible material, with that case being able to bend in a manner that would permit easy insertion and removal of a mobile phone 12 respectively into and from the interior volume 28 of the case 10 through an opening in any of the walls of the case 10 or an opening defined by two or more of those walls.

Figure 1:
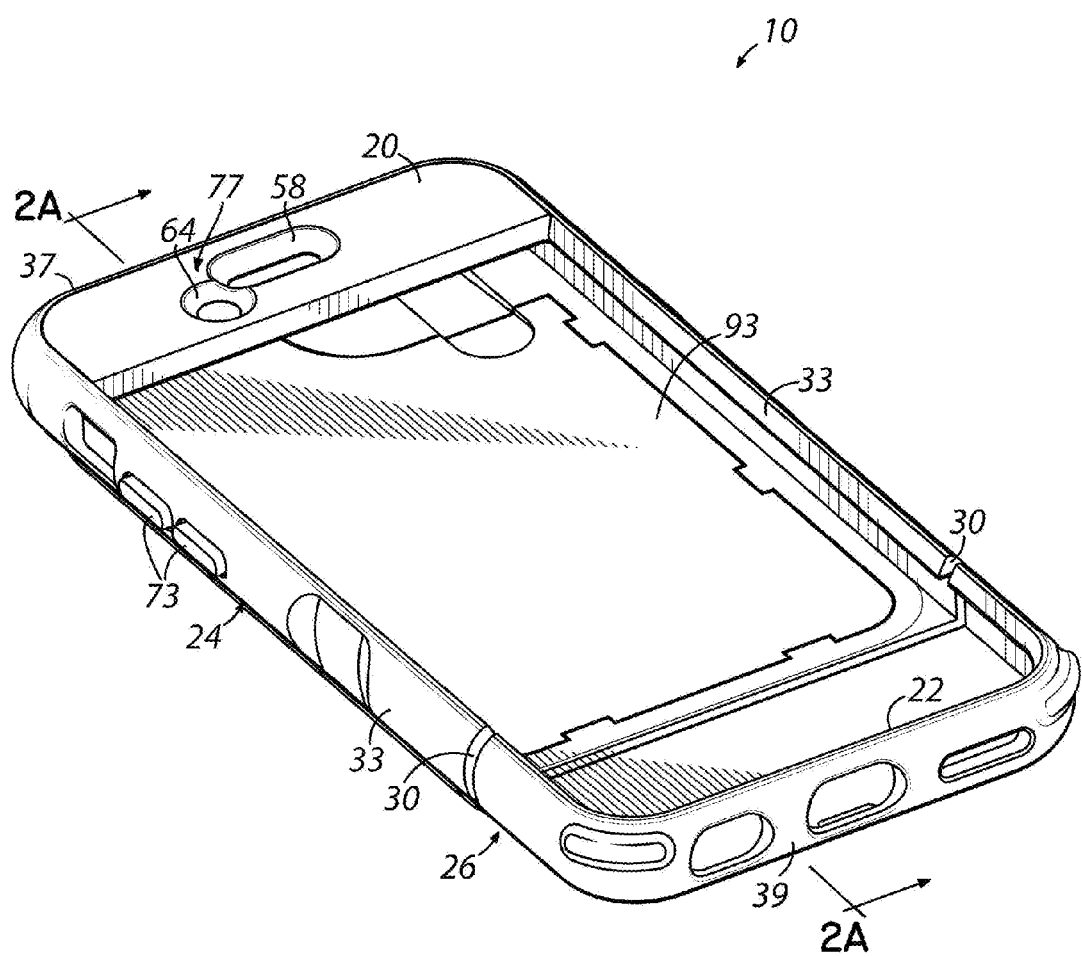
FIG. 1 is a perspective view of an apparatus for at least partially enveloping a portable communication or storage device in accordance with one embodiment of the invention.
Figure 1A:
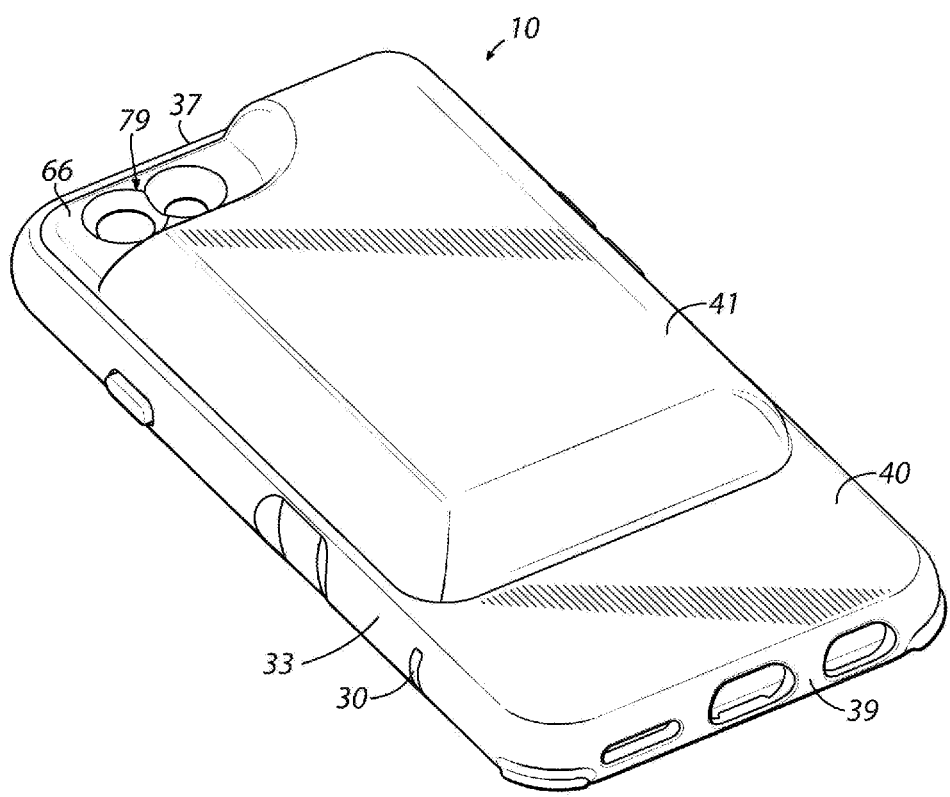
FIG. 1A is another perspective view of the apparatus of FIG. 1, illustrating a rear of that apparatus.
Figure 3:
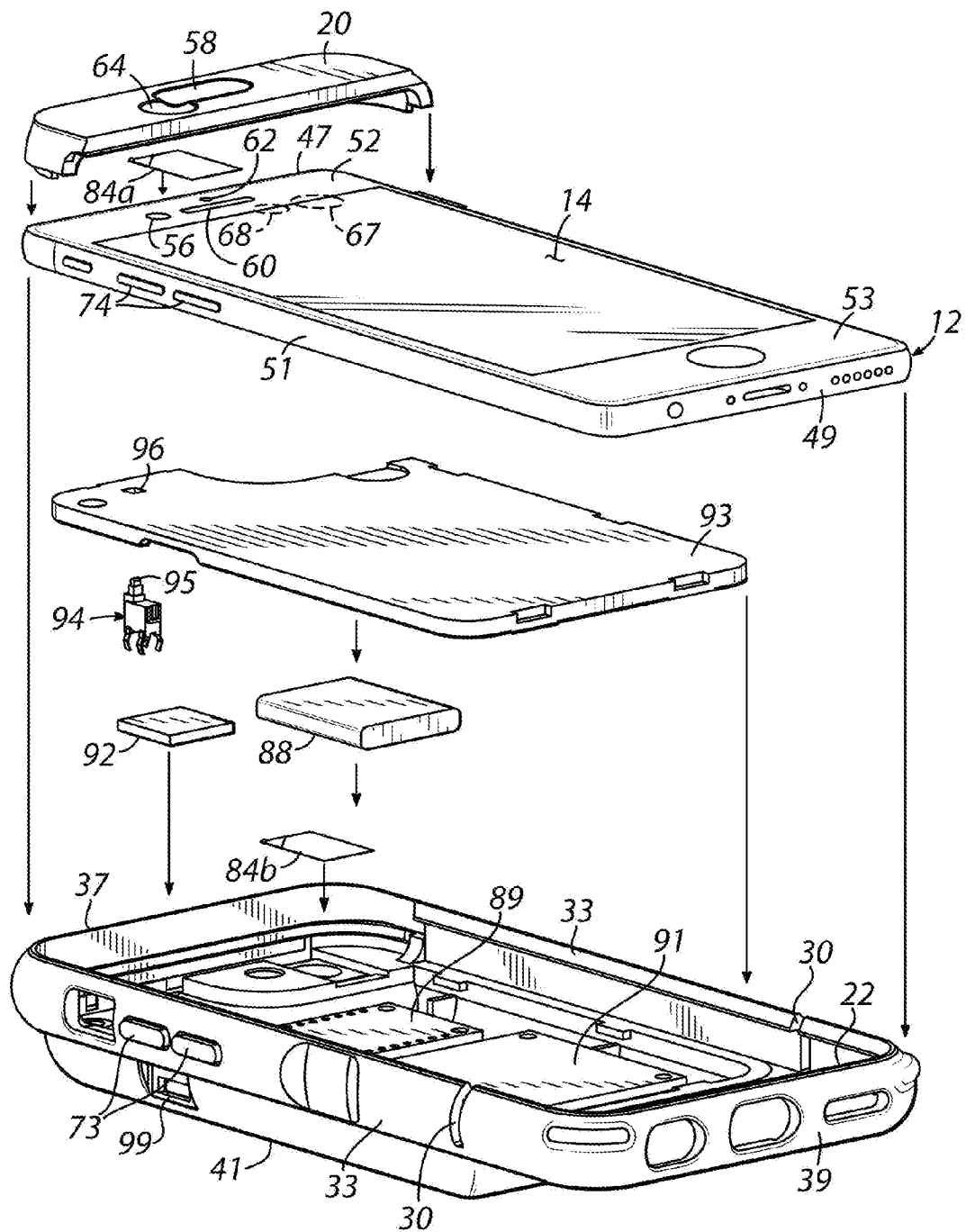
FIG. 3 is a partially disassembled perspective view of a device that includes the apparatus of FIG. 1 and a portable communication and/or storage device, in accordance with one embodiment of the invention.
Figure 4:
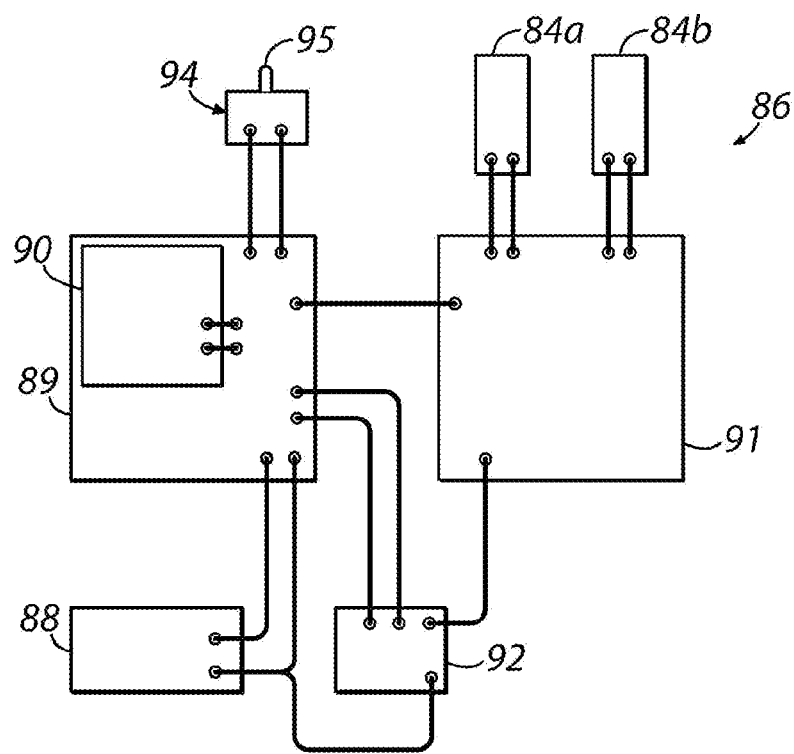
FIG. 4 is a schematic view of an electronic assembly or circuitry of the apparatus of FIGS. 1, 1A, 2A-2C, and 3.

With continued reference to FIGS. 1, 1A, and 2A-2C, and further referring to FIGS. 3 and 4, in the example case 10 of those figures, back walls 40, 41 lie adjacent the back surface 45 of the mobile phone 12, when the mobile phone 12 is enveloped by the case 10. Similarly, the top and bottom walls 37, 39 of case 10 lie adjacent the top and bottom surfaces 47, 49 of the mobile phone 12, while the side walls 33 of case 10 lie adjacent a corresponding pair of side surfaces 51 of phone 12. As discussed above, the case 10 also includes top and bottom front sections 20, 22 configured to partially cover a portion of the front surface 14 of the mobile phone 12. In the illustrated embodiment, the bottom front section 22 is relatively small, and takes the form of a lip extending from bottom wall 39. It is contemplated, however, that bottom front section 22 could instead have a larger area, for example, similar to that of the top front section 20. The top front section 20 in the illustrated embodiment spans between and is connected to the side walls 33 of the case 10, and is also connected to the top wall 37 of the case 10. The top front section 20 substantially overlies a top end section 52 of the front surface 14 of the mobile phone 12. The bottom front section 22 similarly spans between and is connected to the side walls 33 of the case 10, and it is also connected to the bottom wall 39 of the case 10.

The bottom front section 22 overlies a bottom end section 53 of the front surface 14 of the mobile phone 12. As shown in the figures, the top front section 20 of the case 10 is shaped so as to overlie a front camera lens 56 of the mobile phone 12, but includes—in the illustrated embodiment—an opening 58 configured to avoid blocking a speaker 60 and a proximity sensor 62 of the mobile phone 12, and another opening 64 configured to avoid blocking the front camera lens 56 of the mobile phone 12. These features allow the telephonic functionality of the mobile phone 12 to remain intact while the mobile phone 12 is enveloped by the case 10. Similarly, the example case 10 has, as shown in the figures, a plurality of additional openings that allow access to power jacks, data ports or other media-related connection ports, such as audio jacks, of the phone 12. A top section 66 of the back wall 40 of the case 10 overlies a rear camera lens 67 and an associated LED light 68 of the mobile phone 12 that is used as a source of flash for that camera lens 67. The top section 66 of back wall 41 includes a pair of openings 69, 71 that respectively avoid blocking of the rear camera lens 67 and LED light 68. In alternative embodiments, a transparent or at least translucent element such as glass or clear plastic spans one or more of the openings 58, 64, 69, and 71, to prevent debris or the like to penetrate there through.

With continued reference to FIGS. 1, 2A-2C, 3, and 4, the example case 10 illustrated in those figures also includes a plurality of buttons 73 extending from the side walls 33 of the case 10, and which overlie a corresponding plurality of buttons 74 extending from the side surfaces 51 of the mobile phone 12. The buttons 73 on the side walls 33 are positioned so as to selectively engage, when pressed, the adjacent buttons 74 extending from the side surfaces 51 of the mobile phone 12, which for example may control the volume level of media being played by the mobile phone 12, or turn the display of the mobile phone 12 on or off. Alternative embodiments are contemplated in which the side walls 33 of the case 10 have apertures that permit the buttons 74 along the side surfaces 51 of the mobile phone 12 to extend through them, so as to permit the user to directly press those buttons 74 of the mobile phone 12.

Case 10 has features that selectively permit the mobile phone 12 enveloped by the case 10 to take digital impressions such as video or pictures/photographs. Specifically, the case 10 includes, in the top front section 20, a first shutter 77 that has a first condition that permits the taking of digital impressions by the front camera lens 56, and a second condition that prevents or at least hinders the taking of digital impressions by the camera lens 56. The top section 66 of the back wall 40 of the case 10 includes a second shutter 79 that also has a first condition that permits the taking of digital impressions by the rear camera lens 67, and a second condition that prevents or at least hinders the taking of digital impressions by the camera lens 67. As used herein, the term "hinders" and derivatives thereof refer to the ability of the shutters 77, 79 to produce digital impressions with the affected camera lens that are either of low quality, blurry, or of a size that is less than otherwise available. One or both of the first and second shutters 77, 79 may for example and without limitation, be an optical shutter such as an FOS-series model optical shutter, available from LC-Tec Displays AB in Borlänge, Sweden.

Alternatively, one or both of the first and second shutters 77, 79 may be an electrically-operated mechanical shutter that has—for example and without limitation—a retractable element and an actuator, with the actuator being capable of moving the retractable element between open and closed positions. The open position of the retractable element would correspond to the condition of the shutter that permits the taking of digital impressions, while the closed position would correspond to the condition of the shutter that at least hinders the taking of digital impressions by the camera lens that the retractable element selectively overlies. The retractable element in that embodiment may have a solid color and configured to totally block light to the camera lens that the retractable element selectively overlies, or it may alternatively be a translucent structure that only partially allows the transmission of light to the camera lens, to effectively hinder or obstruct the taking of digital impressions with that camera lens.

Other types of electrically or electronically-controlled shutters may also be used, so long as their structure and functionality allow those shutters to selectively permit or prevent or at least hinder the taking of digital impressions by the lens or lenses that those shutters overlie. It is contemplated that in some embodiments the case 10 may have only one shutter that is selectively caused to toggle between the first and second conditions so as to respectively permit or hinder the taking of digital impressions by either the front camera lens 56 or the rear camera lens 67. In embodiments of that type, the other of the front or rear camera lens 56, 67 may be permanently blocked respectively by a wall such as the top front section 20 or the top section 66 of the back wall 40 of the case 10, or by some other structure. It is contemplated that each of the first and second shutters 77, 79 may form part or otherwise be associated with one or more of the walls of case 10, so long as they are effective in selectively hindering or leaving unobstructed the taking of digital impressions with the associated camera lens.

In the non-limiting example embodiment of FIGS. 1, 1A, 2A-2C, 3, and 4, each of the first and second shutters 77, 79 is in the form of a dispersion film 84*a*, 84*b*, such as a polymer dispersed liquid crystal film available from Liquid Crystal Technologies of Cleveland, Ohio. The dispersion film 84*a*, 84*b* in that embodiment has a clear state, allowing the passage of light there through, and an opaque state that blocks or at least hinders the passage of light. The state of the dispersion film 84*a*, 84*b* is controlled by an electronic circuit 86 of the case 10, that includes a power source such as a battery 88, a processor 89 that includes a Bluetooth® board 90, an AC-DC converter 91 that feeds power to the dispersion film 84*a*, 84*b*, and a solid-state relay 92 that serves to relay power from the battery 88 to the converter 91. In the illustrated embodiment, the default state of the dispersion film 84*a*, 84*b* is opaque, with power selectively received by the dispersion film 84*a*, 84*b* being effective to change the state to clear.

Alternative embodiments are contemplated, however, in which the default state of the dispersion film 84*a*, 84*b* is clear, with power selectively received by the dispersion film 84*a*, 84*b* being effective to change the state to opaque. As shown in FIG. 3, the example case 10 in that figure has a first dispersion film 84*a* located between the top front section 20 and the front surface 14 of the mobile phone 12, and disposed so as to overlie the front camera lens 56. A second dispersion film 84*b* is located between the rear surface of the mobile phone 12 and a base wall or base cover 93 of case 10. The second dispersion film 84*b* overlies the rear camera lens 70. While not shown, the example case 10 may include an O-ring or similar structure along the perimeter of the opening 71, effective to prevent the travel of light, when the flash is triggered to take a digital impression, from LED light 68 along the surface of the dispersion film 84b.

The selective toggling or switching of the shutter or shutters 77, 79 between the first and second conditions is controlled by an application (or "APP") installed on the mobile phone 12 enveloped by the case 10, and which controls operation of the processor 89 of the case 10. The processor 89 is operatively coupled to the one or more shutters 77, 79 of the case 10 defined, in the illustrated embodiment, by the pair of dispersion films 84a, 84b. More specifically, the installed APP directs operation of the processor 89 of the case 10 such that toggling of a shutter 77, 79 into the first condition—and thereby the taking of a digital impression—is permitted only if a specific set of conditions is met. For example, the processor 89, as instructed by the APP, may first verify that the electronic circuit 86 of the case 10 is closed, which may only be true—in one example—if the first and second hingedly coupled portions 24, 26 of the example case 10 are fully engaged with one another so as to securely envelop the mobile phone 12.

In the illustrated embodiment, the processor 89 verifies through the APP that the electronic circuit 86 is closed by determining whether or not a limit switch 94 of case 10 has been depressed by placing of the phone 12 in the interior volume 28 of case 10. More specifically, and as shown in FIGS. 2A-2C, the limit switch 94 has a pin 95 that protrudes through an aperture 96 of base cover 93. The presence of the mobile phone 12 in the interior volume 28 of case 10 is effective to depress and thereby actuate limit switch 94. Removal of phone 12 from interior volume 28 causes the pin 95 to return to its original position, corresponding to an unactuated state of limit switch 94. Actuation of the limit switch 94 closes the electronic circuit 86. Additionally or alternatively, the processor 89 may verify, as instructed by the APP, that the mobile phone user's profile and/or a unique identifier (e.g., number) of the mobile phone 12 enveloped by the case 10 against a database containing a list of authorized users and/or authorized mobile phones 12. Once such verification is completed, the APP may direct the processor 89 to allow current to flow to the one or more dispersion films 84a, 84b. In alternative embodiments, for example those in which the default state of a dispersion film 84a, 84b is clear, rather than opaque, upon completing verification the APP may direct the processor 89 to cease the feeding of current to that dispersion film, thereby allowing the unobstructed, unhindered taking of digital impressions with the camera lens that the dispersion film overlies.

In the illustrated embodiment, the flow of current to the one or more dispersion films 84a, 84b, in turn, is effective to cause the one or more dispersion films 84a, 84b to attain the first condition. Conversely, the absence of power in a dispersion film 84a, 84b causes that dispersion film 84a, 84b to remain in the second condition i.e., in which no light flows through that dispersion film 84a, 84b. The inability of light to freely flow through the dispersion film 84a, 84b, in turn, is effective to yield digital impressions—such as photographs or video—taken with the camera lens behind that dispersion film 84a, 84b, that are opaque, blurry, or of general low quality relative to digital impressions taken when light is allowed to freely flow the dispersion film(s) 84a, 84b. Case 10 also includes a power jack 99 that is used to recharge battery 88 of the electronic circuit 86.

In certain embodiments (not shown), the case 10 may include a male connector in the bottom portion 26 of case 10, and that is configured for insertion into a cooperating jack or data port (e.g., mini-USB data port, micro-USB data port) of the mobile phone 12. In those embodiments, the processor may, as instructed by the APP, verify that the male connector is fully inserted into the cooperating jack or data port of the mobile phone 12 and in full contact with the mobile phone's circuitry so as to detect active use of the phone 12. The male connector in those embodiments is operatively coupled to the processor 89. Contacting engagement between the male connector of the case 10 and the mobile phone's circuitry may also be a condition for selectively allowing the shutter(s) 77, 79 to toggle to the first condition, thereby allowing the unhindered taking of digital impressions by one or both of the camera lenses 56, 67.

If any of the above-discussed example conditions is not met, the APP would not permit the one or more shutters to toggle to the first condition, thereby preventing the taking of digital impressions by one or both of the camera lenses 56, 67 of the mobile phone 12. Specifically, in the illustrated embodiment that uses a dispersion film 84a, 84b for shutters 77, 79, if all required conditions are met, the APP directs the processor 89 to allow power to be fed to the dispersion film 84a, 84b, thereby changing the state of the film 84a, 84b from opaque to clear, which in turns allows the taking of digital impressions by one or both of the camera lenses 56, 67.

With continued reference to FIGS. 1, 1A, 2A-2C, 3, and 4, and further referring to FIG. 5, the case 10 may be operatively coupled, through a wireless communication element, such as a WiFi-type connection or a Bluetooth® connection, to a server 100 or some other computer in the controlled environment 11, thereby allowing the case 10 to be networked with that server 100 or computer. Embodiments are also contemplated in which the case 10 is also operatively coupled to the phone 12 through a wireless communication element of the type described above. In the illustrated embodiment, case 10 is operatively coupled to server 100 through the Bluetooth® board 90 that is operatively coupled to processor 89 and which forms part of the electronic circuit 86.

The server 100 automatically saves original copies of all digital impressions taken by the mobile phone 12 from within the APP. In that regard, it is understood that only the installed APP has the capability of selectively allowing toggling of the shutter(s) 77, 79, such that the mobile phone's pre-installed "camera" application(s) would not have the capability of taking digital impressions with a mobile phone's camera when the shutter overlying that camera is in the second condition (e.g., when the dispersion film 84a, 84b, if used for that shutter, is an opaque state). In operation, a user of the mobile phone 12 may be able to retrieve copies of the digital impressions taken by the mobile phone 12, only after those digital impressions have been reviewed and authorized for release by personnel controlling or otherwise accessing the server 100 or other external computer in communication with case 10 and/or phone 12. Server 100 or some other computer external to the case 10 and phone 12 may optionally be located remotely from controlled environment 11, as shown in phantom lines in FIG. 5. If located remotely, the server 100 or computer may be configured to communicate with case 10 and/or with phone 12 via a wireless type of connection, such as Bluetooth® or WiFi.

As discussed above and illustrated particularly in FIGS. 3 and 4, case 10 includes a power source in the form of a battery 88, that provides power to the electronic circuit 86. While not shown, it is contemplated that the battery 88 may serve as a back-up power source for the mobile phone 12 itself, with power flowing from the battery 88 to the mobile phone's battery and/or other components of the mobile phone's electronic circuit through the connection between the optional male connector discussed above (not shown) of the case 10 and the mobile phone's jack or data port. Alternative embodiments are contemplated in which the case 10 does not include a dedicated power source, such as battery 88, but instead obtains power for the processor 89 and other components of the electronic circuit 86 from the mobile phone's battery. In embodiments of that type, a physical connection may be required between the mobile phone 12 and the case 10, such as the example connection described above provided by insertion of the optional male connector of the case 10 and the jack or data port of the mobile phone 12.

The materials, dimensions and overall appearance of the case 10 are suitably chosen to fit particular types of mobile phones, tablets, or other portable communication and/or storage devices. Alternatively, the case 10 may be designed to envelop two or more different types of such devices. In the embodiment shown in FIGS. 1, 1A, 2A-2C, and 3, the case 10 is made to tightly envelop an example Apple iPhone® 6, although the case 10 may alternatively be made to tightly envelop other types of phones, tablets or other devices. The color of the case 10, in particular embodiments, is chosen so as to promote compliance e.g., use of an authorized case 10 enveloping a mobile phone 12 or tablet in the controlled environment 11. More specifically, color, logos, and/or other aesthetic features of the case 10 may be chosen so as to attract attention and/or to facilitate easy identification of the case 10, so that it would be relatively easy to detect a person impermissibly using a mobile phone 12 that is not enveloped by a case 10 authorized in the controlled environment 11. In that regard, security or other type of compliance personnel in the controlled environment 11 could be easily made aware of the unauthorized use of a mobile phone 12 such that appropriate measures may be taken, such as removal of the user of that mobile phone 12 from the controlled environment 11 or even confiscation of the mobile phone 12. The color of the entire case 10 or portions of the case 10 could for example, and without limitation, be a bright and/or fluorescent color.

In use, removal of the mobile phone from the case results in an open compliance circuit, which is effective to toggle the one or more shutters 77, 79 of case 10 to the second condition (i.e., in which the taking of digital impressions is hindered) and is further effective to notify the server 100 (or other element of the network of which server 100 forms part) that the mobile phone 12 is no longer compliant. In that regard, the one or more shutters 77, 79 of the case 10 remain in the second condition unless the case 10 is connected to a mobile phone 12 enveloped by the case 10, and so long as the APP is installed on the mobile phone 12 and used to take digital impressions. The embodiments described herein and contemplated variations of those embodiments are accordingly effective to prevent the use of portable communication and/or storage devices in a controlled environment, and are further effective to prevent those devices from taking digital impressions unless specific conditions are met e.g., the device is properly enveloped and/or connected to an authorized case 10, the APP is installed on the device, and all digital impressions in the controlled environment are taken by the device from within the APP. It is understood that while the embodiments illustrated in the figure and described in connection with that figure disclose a case 10 configured for use with a mobile phone 12, the same principles of operation and structural details may be similarly applicable to cases configured for use with tablets or other types of portable communication and/or storage devices, with those other embodiments being contemplated to fall within the scope of the present disclosure.

It is contemplated that the mobile phone 12 itself may be networked with the server 100 to ensure compliance, applying "geofencing" principles. Specifically, the mobile phone 12 may be connected wirelessly to the server 100 whenever they are in close proximity of one another, such as within the controlled environment 11. For example, the APP installed on the mobile phone 12 may be such that same runs in the background of the mobile phone 12 at all times, and may include a set of instructions that automatically connects the mobile phone 12 to the server 100 whenever the server 100 or the mobile phone 12 itself detects that the mobile phone 12 is within a predetermined distance from the server 100 and/or within the controlled environment 11. Likewise, the set of instructions generated by the APP to processor 89 may automatically disconnect the mobile phone 12 from the server 100 when the server 100 or the mobile phone 12 itself detects that the mobile phone 12 is outside of or beyond the controlled environment 11. To that end, the case 10 may further include, for example and without limitation, a GPS-chip and/or an RFID chip (not shown).

Automatic connection between the mobile phone 12 and the server 100 or other external computer may cause a signal to be generated by the server 100 or other computer or by the mobile phone 12, associated with detection of the phone 12 within the controlled environment 11 but non-compliance with the rule that the phone 12 must be enveloped by an authorized case 10. That generated signal may then permit appropriate measures to be taken by security or other personnel in or around the controlled environment 11, such as removal of the non-compliant user of the mobile phone 12 from the controlled environment 11 or even confiscation of the mobile phone 12. It is also contemplated, in that regard, that the case 10 or the mobile phone 12 itself may generate a signal to the server 100, associated with a condition of compliance e.g., wherein the case 10 and the mobile phone 12 are securely connected to one another in the intended manner.

Referring now to FIGS. 6, 7A, and 7B, those figures show another example embodiment of an apparatus 110 for partially enveloping or encasing a portable communication or storage device in the form of a mobile phone 12. For ease of understanding, like reference numerals in FIGS. 6, 7A, and 7B refer to similar features in the preceding figures, the description of which may be referred to for an understanding of the structure, variations, and functionality of the features of the embodiment of FIGS. 6, 7A, and 7B. Apparatus 110 includes a main compartment 112 that houses various electronic components such as those shown and described above in connection with the features of case 10 (FIGS. 3 and 4) Like the example case 10 of the preceding figures, apparatus 110 includes a plurality of walls that at least partially enclose mobile phone 12. In the example embodiment illustrated in the figures, apparatus 110 includes a pair of walls 116, 118 that are naturally urged toward one another. When the top of phone 12 is inserted between walls 116, 118, the walls 116, 118 are forced apart, and the walls in response exert a holding force against the phone 12 that is effective to frictionally secure the apparatus 110 in place relative to phone 12. Alternative embodiments are contemplated in which the apparatus 110 is secured in place relative to phone 12 through other means that may or may not rely on friction.

Walls 116, 118 of apparatus 110 include respective shutters 77, 79 having a structure and functionality similar to the like-numbered shutters of the example case 10 in the preceding figures. While not shown, apparatus 110 may include a device such as a sensor or switch, that allows one o more of the electronic components housed in main compartment 112 to detect that the phone 12 is secured in place against the walls 116, 118. For example, apparatus 110 may include a limit switch similar in structure and functionality to the limit switch 94 of case 10 of the preceding embodiments. The materials making up walls 116, 118 may be rigid, such as a rigid plastic material, or may alternatively be a non-rigid, flexible material. The materials making up main compartment 112 may be the same as those making up walls 116, 118, or may be different.

From the above disclosure of the general principles of the present invention and the preceding detailed description of exemplifying embodiments, those skilled in the art will readily comprehend the various modifications to which this invention is susceptible. Accordingly, this invention is intended to be limited only by the scope of the following claims and equivalents thereof.

What is claimed is:

1. An apparatus for enveloping a portable communication or storage device, comprising:
   a plurality of walls configured to at least partially enclose the portable communication or storage device;
   a processor; and
   a first shutter associated with one or more of said walls, and operatively coupled to said processor, said first shutter being disposed so as to overlie a first camera lens of the portable communication or storage device, said first shutter having a first condition in which the taking of digital impressions with the first camera lens is unobstructed, and a second condition in which the taking of digital impressions with the first camera lens is hindered,
   wherein:
   said processor is configured to verify that the apparatus is in engaging contact with the portable communication or storage device before allowing said first shutter to toggle from said second condition to said first condition thereof.

2. The apparatus of claim 1, further comprising a second shutter disposed so as to overlie a second camera lens of the portable communication or storage device and operatively coupled to said processor, wherein:
   said second shutter has a first condition in which the taking of digital impressions with the second camera lens is unobstructed, and a second condition in which the taking of digital impressions with the second camera lens is hindered, and
   said processor is configured to verify that the apparatus is in engaging contact with the portable communication or storage device before allowing each of said first and second shutters to toggle from said respective second conditions to said respective first conditions thereof.

3. The apparatus of claim 1, further comprising a power source operatively coupled to said processor and to said first shutter.

4. The apparatus of claim 1, further comprising a wireless communication element operatively coupled to said processor for enabling communication between the apparatus and the portable communication or storage device or a server external to the apparatus.

5. The apparatus of claim 1, wherein said first shutter includes a dispersion film, said first condition corresponding to a clear state of said dispersion film, and said second condition corresponding to an opaque state of said dispersion film.

6. The apparatus of claim 1, further comprising a switch operatively coupled to said processor, said switch having a first position when the portable communication or storage device is enveloped by the apparatus, and a second position when the portable communication or storage device is not enveloped by the apparatus.

7. The apparatus of claim 6, wherein said switch is a limit switch having a pin protruding through one of said walls, said first position thereof corresponding to a depressed condition of said pin, said pin being configured to be depressed upon engaging contact with the portable communication or storage device when enveloped by the apparatus.

8. The apparatus of claim 1, wherein said first shutter includes a retractable element and an actuator operatively coupled to said processor and to said retractable element, said second condition corresponding to said retractable element blocking the first camera lens, said first condition corresponding to said retractable element not blocking the first camera lens.

9. The apparatus of claim 1, wherein said plurality of walls includes one or more walls made of a rigid material and one or more walls made of an elastomeric material.

10. The apparatus of claim 1, wherein said plurality of walls defines first and second portions of the apparatus that are hingedly coupled to one another, pivotal movement of said first and second portions relative to one another allowing insertion of the portable communication or storage device into an interior volume of the apparatus.

11. The apparatus of claim 1, wherein said processor is located within one of said plurality of walls.

12. A privacy system comprising:
    a portable communication or storage device having at least one camera lens; and
    an apparatus for enveloping said portable communication or storage device, said apparatus including
    (a) a plurality of walls configured to at least partially enclose said portable communication or storage device,
    (b) a processor, and
    (c) a shutter associated with one of said walls, and operatively coupled to said processor, said shutter being disposed so as to overlie said at least one camera lens of said portable communication or storage device, said shutter having a first condition in which the taking of digital impressions with said at least one camera lens is unobstructed, and a second condition in which the taking of digital impressions with said at least one camera lens is hindered,
    wherein:
    said processor is configured to verify that said apparatus is in engaging contact with said portable communication or storage device before allowing said shutter to toggle from said second condition to said first condition thereof.

13. The system of claim 12, wherein said portable communication or storage device is a mobile phone.

14. The system of claim 13, wherein said walls include one or more openings configured to prevent obstruction of telephonic or media features of said mobile phone.

15. The system of claim 12, further comprising a server or external computer wirelessly connected to at least one of said apparatus or said mobile phone.

16. A method for controlling use of a portable communication or storage device in a controlled environment, the portable communication or storage device having at least one camera lens, the method comprising:
- enveloping the portable communication or storage device in an apparatus, the apparatus having a processor and a shutter operatively coupled to said processor, the shutter having first and second conditions to respectively leave unobstructed or hinder the taking of digital impressions with the at least one camera lens;
- verifying, by the processor, that the apparatus is in engaging contact with the portable communication or storage device; and
- allowing by the processor, in response to the verifying that the the apparatus is in engaging contact with the portable communication or storage device, the shutter to toggle from the second condition to the first condition thereof.

17. The method of claim 16, further comprising verifying that the location of the apparatus or the portable communication or storage device is within a predetermined distance of an external server or computer.

18. The method of claim 16, further comprising verifying that an instruction by a user to the portable communication or storage device is effected from within a pre-specified application installed in the portable communication or storage device.

19. The method of claim 16, further comprising the processor communicating with an external server or computer.

20. The method of claim 19, further comprising the portable communication or storage device communicating with the external server or computer.

* * * * *